United States Patent [19]

Fu

[11] Patent Number: 4,778,214
[45] Date of Patent: Oct. 18, 1988

[54] SHIELD APPARATUS FOR MOTORCYCLE

[76] Inventor: Chuen-Fong Fu, No. 13, Lane 685, Sec. 3, Fong-Lin Rd., Lin Yuan Hsiang, Kaohsiung Hsien, Taiwan

[21] Appl. No.: 99,155

[22] Filed: Sep. 21, 1987

[51] Int. Cl.⁴ ............................................. B62D 25/06
[52] U.S. Cl. .................................. 296/102; 296/78.1; 135/88
[58] Field of Search .................. 296/102, 78.1; 135/88

[56] References Cited
FOREIGN PATENT DOCUMENTS 1189433 10/1959 France ................................. 296/78.1
0652792 2/1963 Italy .................................... 296/78.1
2096955 2/1981 United Kingdom ................ 296/102

Primary Examiner—Robert B. Reeves
Assistant Examiner—John Gruber
Attorney, Agent, or Firm—Angelo Notaro

[57] ABSTRACT

A shield apparatus for mounting on a motorcycle or the like which includes a front strut, a rear strut, a top cover and two bracket plates. The shield apparatus is mounted on the front handle members and the rear portion of the motorcycle so that the top cover thereof can be functioned to minimize the effects of windage and adverse weather conditions during motorcycle runs.

10 Claims, 6 Drawing Sheets

SHIELD APPARATUS FOR MOTORCYCLE

BACKGROUND OF THE INVENTION

This invention relates to a shield apparatus and more particularly to a shield apparatus for motorcycles.

Riding a motorcycle is not only a recreational pasttime enjoyed by millions of people, but it is also or alternatively an important source of transportation for many millions of commuters. Whether out of desire or due to necessity, many motorcycle owners choose to mount a shield apparatus on their motorcycles as a means for protecting themselves from light, sunshine and rain during riding.

A shield apparatus which can accommodate most any conventional two-wheeled motorcycle is available. Typically, such shield apparatus is supplied with a frame or bracket, one end being attached to the motorcycle by the preexisting bolt which is used to maintain the shield at a preselected height. The other end of the shield apparatus is typically connected either to the preexisting motorcycle frame members which extend upwardly and rearwardly from the motorcycle seat region to the rear wheel axle supporting member, or to the axle supporting member itself. At least one substantial disadvantage associated with the above manner of mounting the shield apparatus is that it must be bolted to its frame or bracket. Therefore, improving the technique used to mount the conventional shield apparatus would be deemed desirable.

SUMMARY OF THE INVENTION

It is, therefore, an object of this invention to provide a shield apparatus which can be mounted on a motorcycle or the like in such a manner that it does not create much windage during motorcycle runs.

Another object of this invention is to provide a shield apparatus which can be readily assembled and disassembled.

Still another object of this invention is to provide a shield apparatus having a cover sheet which can be detached therefrom to facilitate washing.

BRIEF DESCRIPTION OF THE DRAWINGS

This invention will be more fully understood in conjunction with the following detailed description together with the attaching drawings, in which.

DETAILED DESCRIPTION OF THE INVENTION

Figure 1:
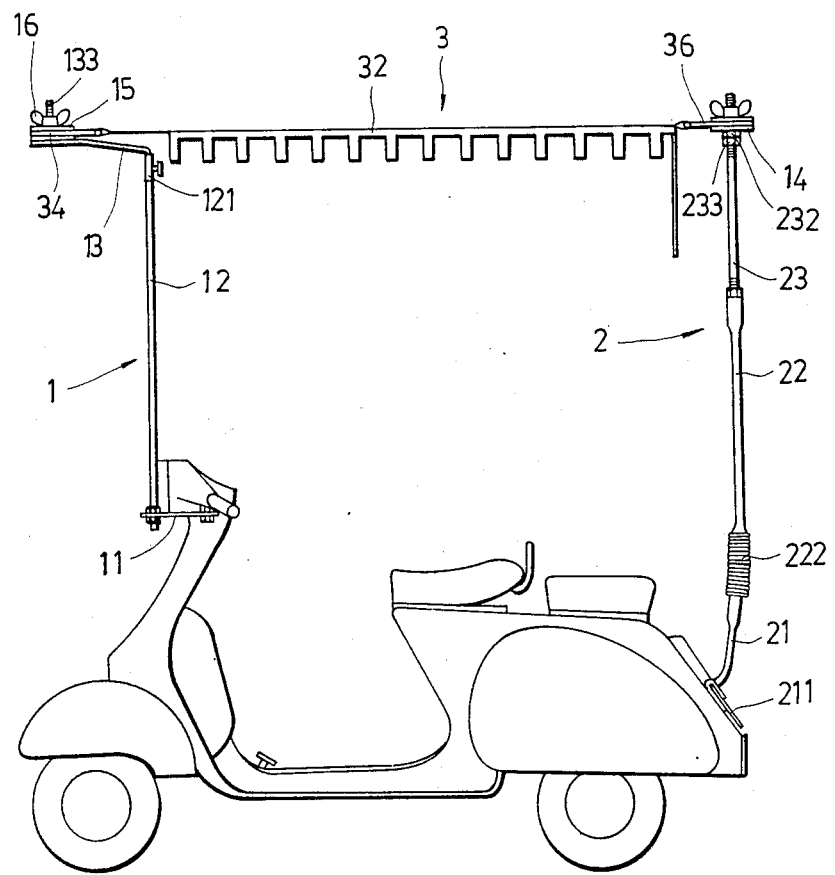
FIG. 1 is a side view of a first embodiment of this invention which shows that the shield apparatus is mounted on a motorcycle.
Figure 2:
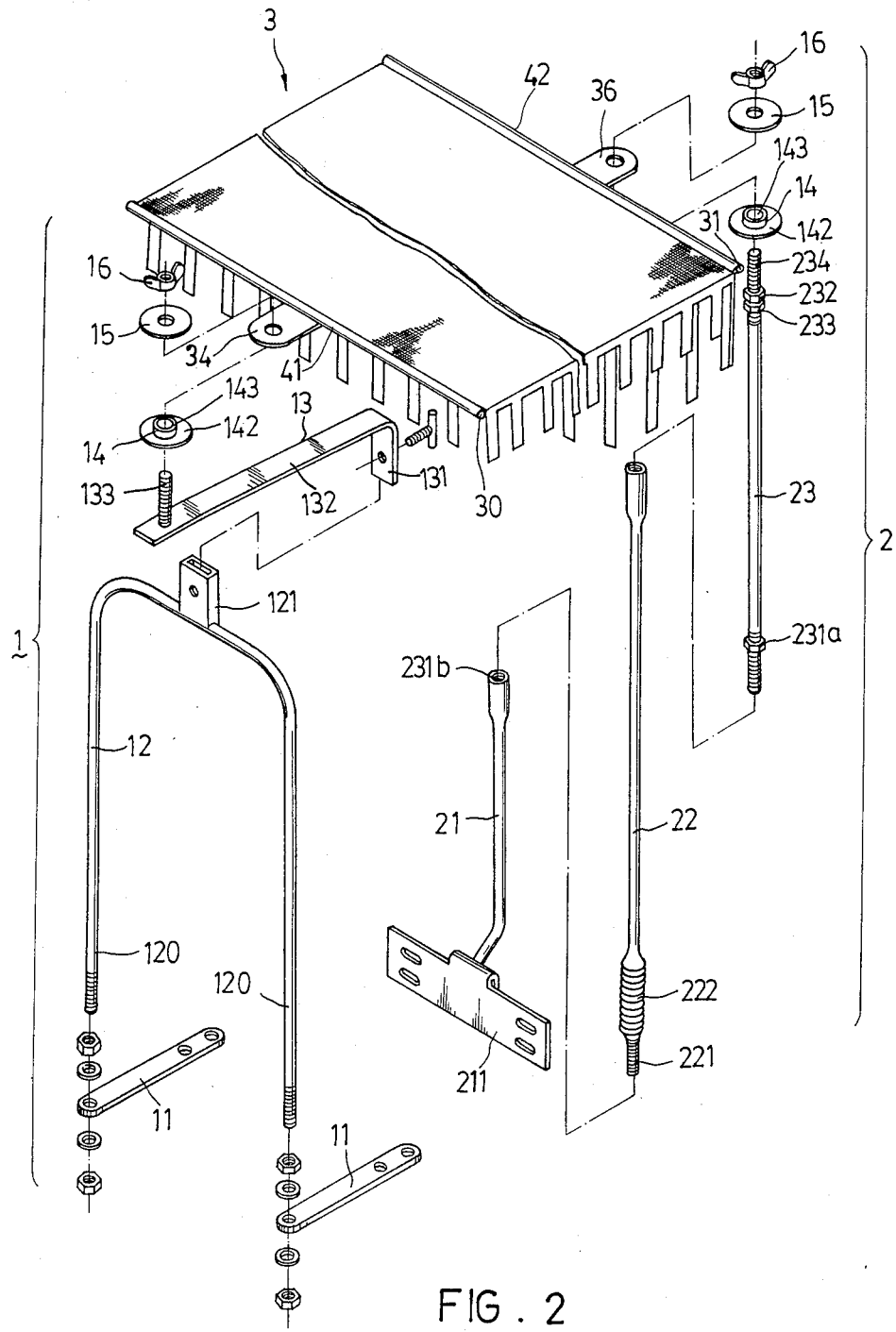
FIG. 2 is an exploded schematic view illustrating the first embodiment of this invention.
Figure 3:
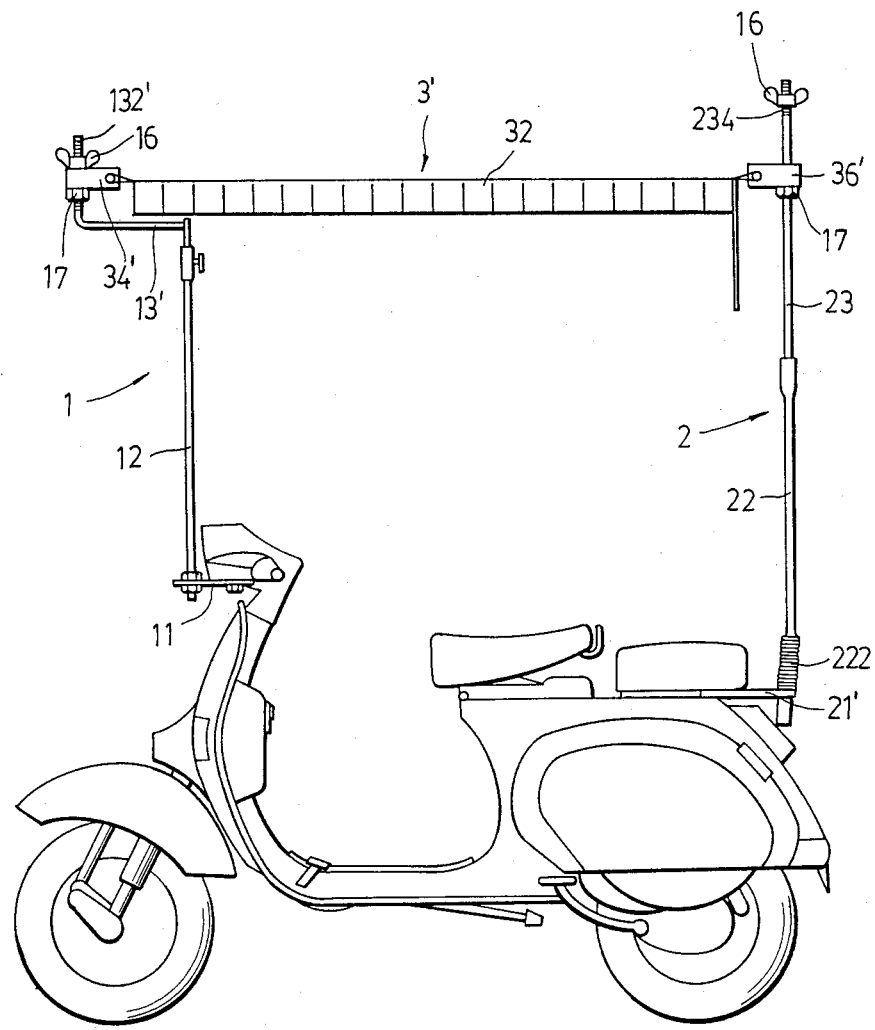
FIG. 3 shows a side view of a second embodiment of this invention which is mounted completely on the motorcycle.

With reference to the drawings and particularly to FIGS. 1 and 2, a shield apparatus mounted on a motorcycle is shown thereon. This shield apparatus includes a front strut means 1, a rear strut means 2 and a top cover means 3. The front strut means 1 include a substantially U-shape rod 12 which has two vertical arms 120 to be mounted on a handle of the motorcycle and an upper transverse portion having a projecting member 121 at its intermediate portion, and a substantially L-shaped member 13 having a vertical portion 131 secure to the projecting member 121 of the upper transverse portion and a forwardly extending horizontal portion 132 with a screw rod 133 extending upwardly therefrom.

Two plate members 11 each have a front end secured to each vertical arm 120, and a rear end secured to the handle of the motorcycle and projected forwardly therefrom.

The rear strut means 2 includes a lower upright one piece rod member 22 which has a threaded bottommost portion 221 and a coiled resilient portion 222 thereabove for providing the rear strut means a degree of resiliency and flexibility. An upper one-piece rod member 23 is interconnected with the lower one-piece rod member through an adjustment screw 231a.

Figure 6:
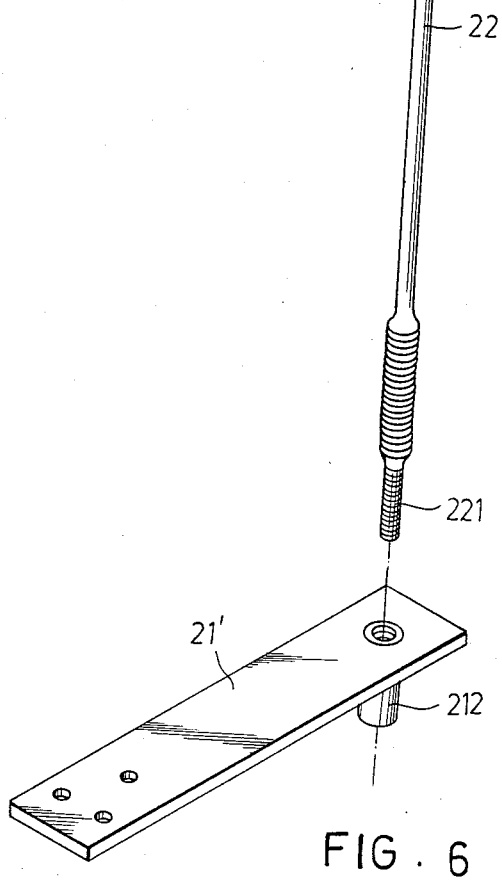
FIG. 6 shows the rear strut means of the second embodiment.

As shown in FIG. 6, a plate member 21' is mounted in proximity to a rear seat of the wheeled body and projects rearwardly therefrom. A screw member 212 is secured to the threaded bottommost portion 221 of the rear strut means 2 to the plate member 21'.

A plate member 211 is secured to the wheeled body below the rear seat, and a stem 21 extends upwardly from the plate member 211 and is secured to the threaded bottommost portion of the rod 22 at 231b.

The top cover means 3 includes a sheet member 32 having a front transverse side 41 and a rear transverse side 42, a front sheet holding rod 30 attached to the front transverse side 41 and a rear sheet holding rod 31 attached to the rear transverse side 42. Bracket plates 34 and 36 are secured to and project respectively from the intermediate portions of the front and rear rods 30 and 31. Circular holes are provided in the bracket plate 34 and 36 for permitting the bracket plates 34 and 36 to be respectively sleeved movably on a top most threaded end portion 234 of the rear strut 2 and the screw rod 133 of the front strut 1.

Sleeves 14 are disposed respectively around the topmost threaded end portion 234 of the rear strut and the screw rod 133 of the front strut and inserted into the circular holes of the bracket plates 34 and 36, each sleeve 14 having a first end with an outwardly projecting flange 142 at one side of each bracket plate 34 and 36 and a second end 143 at the other side of the bracket plate.

A retaining plate 15 abuts with the second end of each sleeve 14. On the front strut, clamping nut 16 clamps the retaining plate 15 against the sleeve 14 and positions them on the screw rod 133. On the rear strut, nuts 16, 232 and 233 are provided to clamp the retaining plate 15 and the sleeve 14. The bracket plates 34 and 36 are rotatable and vertically movable relative to the respective sleeves between the flanges of the sleeve and the retaining plates. Since the bracket plates 34 and 36 are movable relative to the front and rear struts, the front and rear sheet holding rods 30 and 31 and the cover sheet 32 can make a limited vertical and angular displacement relative to the front and rear strut means 1 and 2 and incline upward and downward relative to a horizontal line so as to minimize windage.

Figure 4:
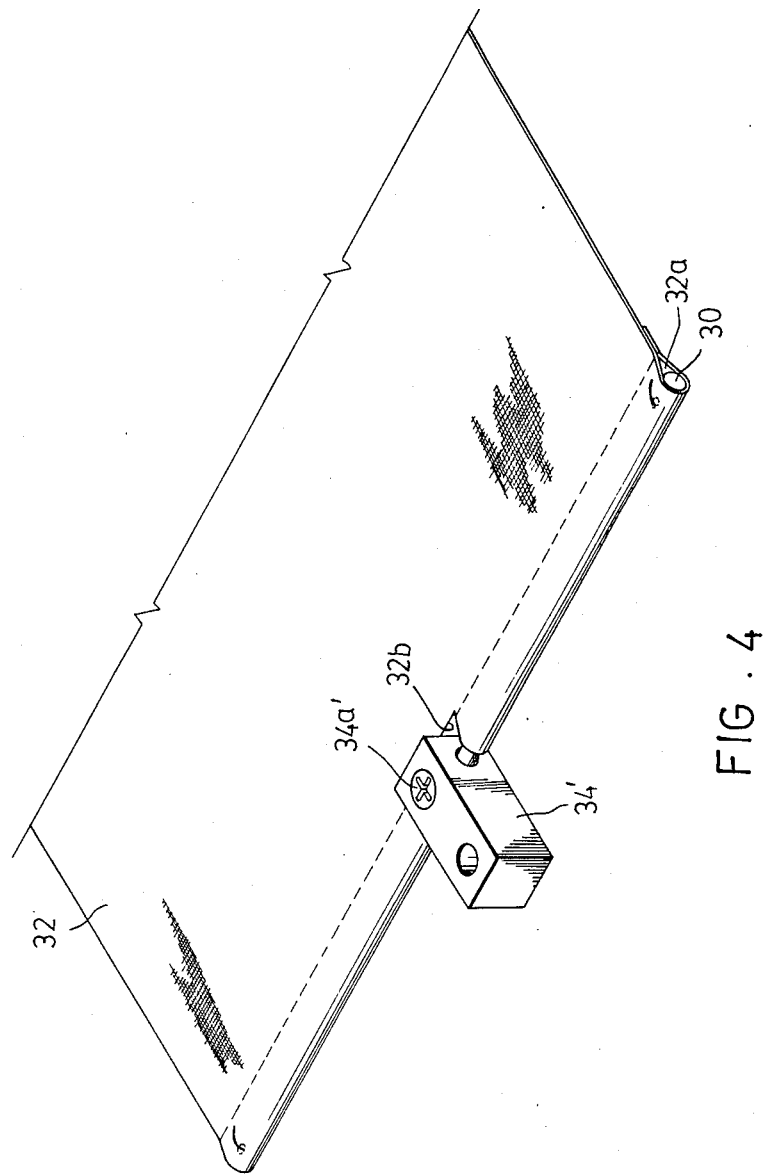
FIG. 4 is a perspective view showing the top cover means of the second embodiment.

FIGS. 3, 4, 5 and 6 show another embodiment of this invention in which elements similar to those of the first embodiment are designated by similar reference numerals. This embodiment is somewhat different from the previous embodiment. As shown in FIG. 4, a bracket block 34' is connected detachably to the front sheet holding rods 30. The sheet holding rod 30 is inserted in a sleeve portion 32a of the sheet 32 formed by sewing the cover sheet 32. The sleeve portion 32a has a discontinuation 32b to expose the sheet holding rod 30. The bracket block 34' is sleeved on the exposed portion of the rod 30 and is attached fixedly thereto by means of a screw 34a'. It can be appreciated that the block 34' so attached allows the sheet 32 to be separated from the rod 30. The rear bracket block 36' is attached likewise to the sheet 32. Accordingly, the sheet 32 of this embodiment can be readily detached from the rods 30 and 31 for washing.

Figure 5:
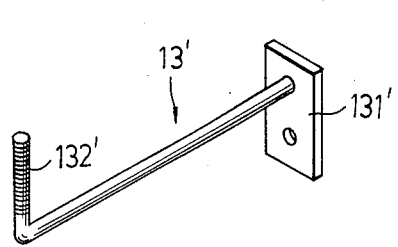
FIG. 5 is a perspective view showing the substantially L-shape member of the second embodiment.

As shown in FIG. 5, the L-shaped member 13' is a rod having an upwardly projecting screw rod portion 132' and a rear plate 131' to be connected to the U-shaped rod 12. Blocks 34' and 36' each have a circular hole therein for permitting the topmost threaded portion of the rear strut means 2 or the screw rod 132' of the front strut means 1 to extend therethrough. Two nuts 16 and 17 are disposed respectively above and below the bracket block on the topmost threaded portion 234 of the rear strut 2 or the screw rod 132' of the front strut 1.

As shown in FIG. 6, a plate member 21' is mounted in proximity to a rear seat of the wheeled body and projects rearwardly therefrom. The bottommost portion 221 of the rear strut means 2 is connected with threads to a screw member 212 for securing the plate member 21' to the wheeled body.

Figure 7:
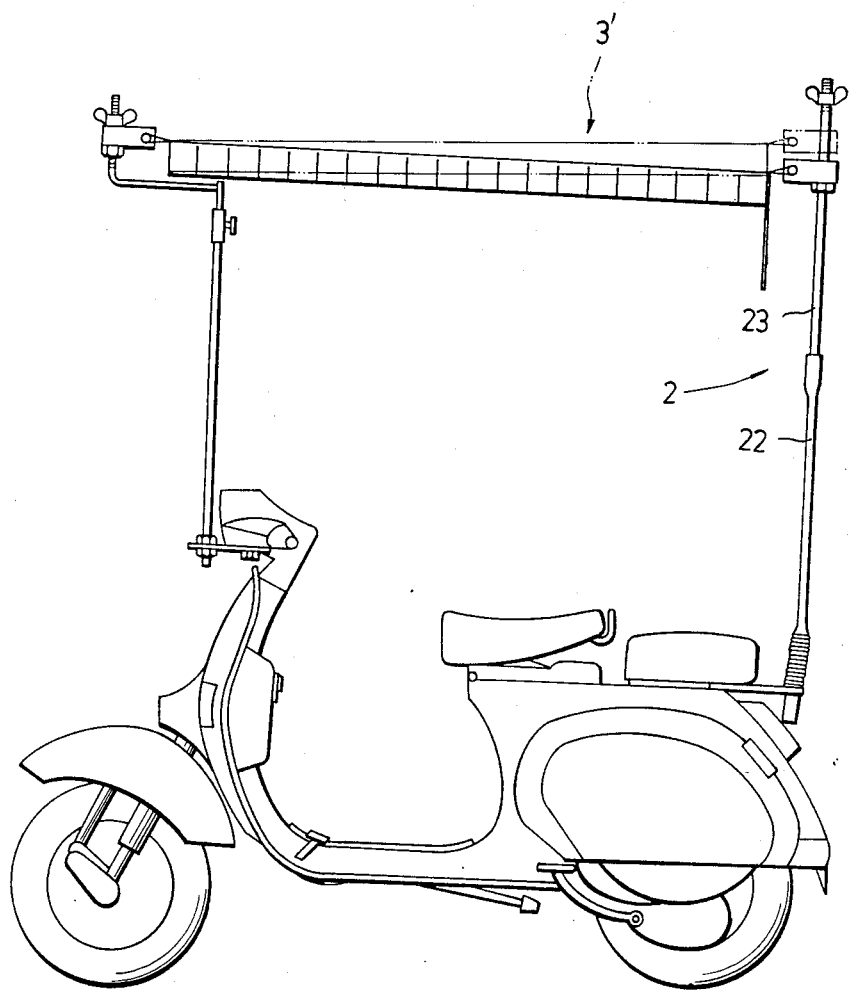
FIG. 7 shows how the shield of the second embodiment functions during motorcycle runs.

As shown in FIG. 7, the nuts on the topmost threaded portion 234 of the rear strut 2 are spaced apart from the bracket block 36' to permit the bracket block to rotate and move upward and downward relative to the topmost threaded portion, and the nuts on the screw rod 132' hold the bracket block 34' in such a manner that the block 34' can pivot about the screw rod 132'.

While two embodiments of the invention have been illustrated and described in considerable detail, it will be understood that these were only by way of example and that various changes in the details of the construction and arrangement of the various parts may be made without departing from the spirit and scope of the invention, as reflected in the appended claims.

What is claimed is:

1. A shield apparatus for mounting on a motorcycle or the like which includes a wheeled body with a rear portion and a front handle member with two end portions, comprising:
   a top cover means including a sheet member having a front transverse side and a rear transverse side, a front sheet holding rod attached to said front transverse side, and a rear sheet holding rod attached to said rear transverse side;
   a front strut means having two front mounting portions to be respectively mounted on the wheeled body in the proximity of the two end portions and a front upper portion;
   a rear strut means having a rear mounting portion to be mounted on the rear portion of the wheeled body, and a rear upper portion;
   front and rear connecting means for connecting respectively said front and rear upper portion of said front and rear strut means to intermediate portions of said front and rear sheet holding rods, said connecting means permitting said front and rear sheet holding rods to make limited vertical and angular displacements relative to said upper portions of said front and rear strut means and to make upward and downward displacement relative to a horizontal line so as to minimize windage; a front mounting means for connecting said front mounting portions to said two end portions of the wheeled body; and
   a rear mounting means for connecting said rear mounting portion to the rear portion of the wheeled body.

2. A shield apparatus as claimed in claim 1, wherein said front strut means includes a substantially U-shaped rod which has two vertical arms defining said front mounting portions and an upper transverse portion interconnecting said arms portions, said upper transverse portion having an intermediate portion with an upwardly projecting member, and a substantially L-shaped member having a vertical portion secured to said projecting member of said upper transverse portion and a forwardly extending horizontal portion.

3. A shield apparatus as claimed in claim 2, wherein said front mounting means includes two plate members, each of which has a front end secured to each of said vertical arms and a rear end secured to the handle member and projects forwardly therefrom.

4. A shield apparatus as claimed in claim 3, wherein said rear strut means includes an upright one-piece first rod member which has a threaded bottommost portion and a coiled resilient portion thereabove for providing said rear strut means a degree of resiliency and flexibility.

5. A shield apparatus as claimed in claim 1, wherein said rear mounting means includes a plate member mounted in the proximity of a rear seat of said wheeled body and projects rearwardly from said rear seat, and a screw member for securing a threaded bottommost portion of said rear strut means to said plate member of said rear mounting means.

6. A shield apparatus as claimed in claim 4, wherein said rear strut means further includes an upright one-piece second rod member, and an adjustment screw member interconnecting said first and second rod member, thereby enabling said rear strut means to be adjusted in height.

7. A shield apparatus as claimed in claim 1, wherein said rear mounting means includes a plate member secured below a rear seat of said wheeled body, and a stem extending upwardly from said plate member of said rear mounting means and being secured to a threaded bottommost portion of said rear strut means.

8. A shield apparatus as claimed in claim 6, wherein said upright first rod member of said rear strut means has a topmost threaded end portion, and said horizontal portion of said L-shaped member of said front strut means has a screw rod extending upwardly therefrom.

9. A shield apparatus as claimed in claim 8, wherein each of said front and rear connecting means includes a bracket plate secured to and projecting from an intermediate portion of said front or rear sheet holding rod which has a circular hole therein for permitting said bracket plate to be sleeved movably on said topmost threaded end portion or said screw rod, a sleeve disposed around said topmost threaded end portion or said screw rod and inserted into said circular hole of said bracket plate, said sleeve having a first end with an outwardly projecting flange at one side of said bracket plate and a second end at the other side of said bracket plate, a retaining plate abutting with said second end of said sleeve, and a clamping nut means clamping said sleeve and said retaining plate against one another and positioning them on said topmost threaded end portion or said screw rod, said bracket plate being rotatable and vertically movable relative to said sleeve between said flange of said sleeve and said retaining plate.

10. A shield apparatus as claimed in claim 8, wherein each of said front and rear connecting means include a bracket block connected detachably to said front or rear sheet holding rod and having a circular hole therein for permitting said topmost threaded portion of said rear strut means or said screw rod of said front strut means to extend therethrough, and two nut members disposed respectively above and below said bracket block on said topmost threaded portion or said screw rod, wherein said nut members on said topmost threaded portion being spaced apart from said bracket block for permitting said bracket block to rotate and move upward and downward relative to said topmost threaded portion, and said nut members on said screw rod permitting said bracket block to pivot only about said screw rod.

* * * * *